United States Patent Office 3,360,043
Patented Dec. 26, 1967

3,360,043
METHOD OF TREATING CLAY-CONTAINING FORMATIONS WITH GUANIDINE SALT SOLUTION
William B. Braden, Jr., and Joseph T. Carlin, Houston, Tex., assignors to Texaco Inc., New York, N.Y., a corporation of Delaware
No Drawing. Filed Dec. 22, 1965, Ser. No. 515,707
16 Claims. (Cl. 166—9)

The present invention relates to the treatment of clay containing formations. More particularly, this invention relates to a method of treating underground formations containing clays or clay like materials to increase the water permeability of the clay and/or to restore the water permeability of clays which have been previously damaged by water so that their water permeability has been materially reduced.

In modern-day production of oil from underground formations it has become fairly common practice to apply secondary recovery techniques to an oil containing formation in order to recover therefrom additional quantities of oil. Among the methods employed in secondary recovery operations mention is made of water flooding, steam injection, gas flooding and combinations thereof. One of the most serious problems encountered in secondary recovery operations with water flooding or steam injection procedures is that the underground oil-containing formation also contains clay or clay like bodies associated therewith. Treatment of such a formation with water or steam generally results in swelling of the clay by adsorption of the water with the concomitant result that the water permeability of a formation is materially decreased. The decrease in the water permeability of the formation to water results in the loss of the oil contained therein from being recovered by secondary recovery operations.

It is known from U.S. 2,761,843 that clay-containing bodies can be stabilized by treatment with substituted ammonium ions derived from basic nitrogen compounds represented by the following general formula:

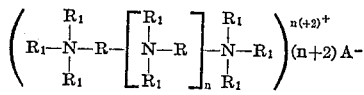

wherein $R_1$ is selected from the group consisting of hydrogen, methyl, ethyl and propyl groups; R is an alkylene group having from 2 to 12 carbon atoms, with the sum of the number of carbon atoms contained in the R groups plus two times the total number of carbon atoms in all $R_1$ groups being at least 6; $n$ is an integer from 0 to about 100; and A is an anion such as chloride, bromide, iodide, nitrate, lactate, citrate, salicylate, propionate, etc. This patent teaches that guanidine hydrochloride is an unsatisfactory material for use as a treating agent to stabilize clay since clays treated therewith were easily dispersed and resulted in aqueous solutions having a colloidal appearance.

It has now been found that a clay-containing formation can be effectively treated to improve the water and/or steam permeability of the clay with a prescribed class of guanidine salts provided that the salt is dissolved in a polar organic solvent, namely, a polar oxygenated aliphatic hydrocarbon solvent selected from the group consisting of a lower alkanol, dimethyl sulfoxide, a mixture of dimethylsulfoxide and dioxane or a mixture of lower alkanols. It has been found that treatment of an underground clay-containing formation with a solution of the prescribed class of guanidine salts in such a polar oxygenated aliphatic hydrocarbon solvent materially increases the permeability of the clay-containing formation to subsequent water treatment and, in addition, that treatment in accordance with the method of the present invention also restores the water permeability of formations which have been previously damaged by contact with water.

The prescribed class of guanidine salts useful in the present invention includes the hydrogen halides such as guanidine hydrochloride, guanidine hydrobromide, and guanidine nitrate, guanidine acetate and mixtures thereof.

The method of the present invention has particular applicability in secondary recovery operations wherein water flooding or steam injection is employed as the secondary driving force to recover the oil from the formation. In such a secondary recovery operation for example, water flooding, the injection water is introduced into the formation through an injection well under pressure and forced out into the oil containing formation. The pressure maintained on the water injected into the formation displaces or forces the oil to move toward the producing well which is located relatively distant from the injection well. At the producing well the driven oil is recovered by conventional means.

In carrying out the method of the present invention it has been found desirable to inject the prescribed class of guanidine salts in the specified polar oxygenated aliphatic hydrocarbon solvent into the formation from the injection well and to maintain the injected treating solution in contact with the clayey portion of the underground formation for a period of time such as from about 1 to about 7 days to effect stabilization to the clay materials in contact with the treating solution. Thereafter the secondary recovery injection fluid can be introduced into the formation in a conventional manner which is well known in the art. If the permeability of the formation to the secondary recovery injection fluid is reduced as is evidenced by a reduction in the flow of oil from the producing well, the flow of secondary recovery injection fluid into the injection well is discontinued. There is introduced into the injection well the treating solution of the present invention in an amount sufficient to restore the permeability of the formation to the injection fluid. This restoration treatment is carried out in the same manner as described hereinabove. Subsequent to the restoration treatment the secondary recovery injection fluid flow into the injection well can be initiated again.

The concentration of the prescribed class of guanidine salts in the polar oxygenated aliphatic hydrocarbon solvent can vary from about 0.5% up to about 65% by weight, dependent on salt solubility in the solvent, but for the most satisfactory results a concentration between about 5% and about 20% have been found to be most effective. Employment of the prescribed class of guanidine salts in a concentration of below about 0.5% is impractical since relatively large amounts of such a dilute treating solution would be required to bring the guanidine salt treating agent into contact with the clay in and about the injection well so as to increase the clay permeability. Concentrations above about 25 to 30% are impractical also from a cost basis as no improvement in permeability is attained by use of such high concentrations. A preferred concentration for the preferred salt, guanidine hydrochloride, is from about 5% to about 20% by weight. In the treatment of the underground formation by the present invention methanol has been found to be the most effective solvent since it is relatively low in cost and easily available.

Following is a description by way of example of the treating method of the present invention.

Example I

A core was obtained from a bore hole at a depth of 3,565–3,566 feet. A portion thereof in the form of a plug having a pore volume of 2.02 ml. was removed from the core. The plug was cleaned with toluene and its porosity and air and water permeability were determined in a conventional manner. The air permeability was 5.6 md., the water permeability 0.98 md., and the porosity 25%.

Thereafter about 9.5 pore volumes of a 10% by weight sodium chloride brine solution were injected into the plug until the plug was saturated with the brine solution.

Then there was injected into the plug 35 pore volumes of a 5 weight percent solution of guanidine hydrochloride in methanol and the liquid permeability of the plug determined. Its permeability was found to be 123.5% of the original permeability to the brine solution.

*Example IA*

The treated plug of Example I above was injected with distilled water in an amount of 5 pore volumes and the permeability again determined. The permeability of the treated plug was found to be 79% of the original permeability, a decrease of only 44.5 percentage points.

This example demonstrates that the guanidine hydrochloride in methanol treatment provides improved permeability protection to the formation. An untreated plug when contacted with distilled water would show a reduction in permeability to about zero.

*Example II*

Following the procedure of Example I above, another plug was taken from the core of Example I and its characteristics were determined. The air permeability was found to be 5.0 md., its porosity as 26%, its pore volume 2.06 ml., and its water permeability 0.75 md.

This plug was also treated by injecting 7 port volumes of a 10% brine solution followed by repeated injection of a 5 weight percent solution of guanidine hydrochloride in methanol. After injection of about 3 pore volumes of the treating solution it was found that the permeability had been reduced to about 34% of the original permeability to brine. Treatment was continued with guanidine hydrochloride in methanol solution so that about 5 additional pore volumes were injected into the plug. The permeability was found to have increased to 52% of the original permeability to brine. An additional 5 pore volumes of guanidine hydrochloride in methanol increased the permeability to about 95% of the original permeability to brine. After a total of about 30 pore volumes of guanidine hydrochloride in methanol had been injected into the plug the permeability was found to be 132% of the original permeability to the brine solution.

*Example IIA*

The treated plug of Example II above was further treated by injecting therein 8 pore volumes of distilled water. The porosity following injection of distilled water was found to be 85% of the original permeability of the plug to brine, representing a decrease (from 132% of Example II above to 85%, of only 47 percentage points in permeability).

A set of plugs were obtained from core samples of a well and the properties of the plugs were determined. In this series of tests the plugs were not cleaned prior to testing. The properties of the plugs are shown in the following Table I.

TABLE I

| Depth of Core, ft. | Core | $K_a$, md. | $K_w$, md. | Pore Vol., ml. | Porosity, Percent |
|---|---|---|---|---|---|
| 1,746 | A | 5.0 | 0.64 | 1.173 | 14.6 |
| 1,746 | B | 50.9 | 16.0 | 1.407 | 17.4 |

A synthetic formation water was prepared based on the analysis of a produced formation water in the zone of the field from which the cores were obtained. The synthetic formation water was made up with distilled water to contain 6200 p.p.m. of calcium ion, 7600 p.p.m. of sodium ion and 22,100 p.p.m. of chloride ion.

The liquid permeability of each of the plugs was measured in a standard permeameter at ambient temperature with a pressure drop of 20 p.s.i. across the plug.

A series of tests were conducted on the plugs cut from the cores of Table I above. Details of this series of tests are shown in the following examples.

*Example III*

A plug cut from core A above was injected with varying amounts of a 17 gram guanidine hydrochloride in 100 ml. solution of methanol and the permeability was determined at stated intervals. Table II below shows the results of the injections.

TABLE II.—PERCENT ORIGINAL PERMEABILITY

| Cumulative Amount Injected | | Percent |
|---|---|---|
| Ml. | Pore Vol. | |
| 0 | 0 | 100 |
| 25 | 21.3 | 172 |
| 50 | 42.6 | 220 |
| 75 | 63.9 | 242 |
| 80 | 68.2 | 246 |

Table II above shows that injection of the treating solution of the present invention into a plug will improve the liquid permeability of the plug to a considerable extent. For example, when about 21.3 pore volumes of the treating solution of the present invention had been injected into the plug the percent of the original permeability had increased to 172% and when the amount of injection material was increased to 42.6 pore volumes the percent of original permeability had increased to about 220%. A maximum of about 240% of original permeability was attained by the use of about 68.2 pore volumes of the treating solution of the present invention.

*Example IV*

The plug which had been treated as described in Example III above then was injected with distilled water to demonstrate the effectiveness of the treatment.

The following table shows the results of these tests. The starting point in the table was taken as the percent permeability obtained after injection of 80 ml. of guanidine hydrochloride in methanol solution. (80 ml. represents 68.2 pore volumes.)

TABLE III.—PERCENT ORIGINAL PERMEABILITY TO FORMATION WATER

| Cumulative Amount Injected | | Percent |
|---|---|---|
| Ml. | Pore Vol. | |
| [1] 0 | [1] 0 | 246 |
| 20 | 17.3 | 268 |
| 32 | 27.2 | 270 |
| 70 | 59.6 | 260 |
| 120 | 102 | 248 |
| 220 | 187 | 228 |
| 320 | 272 | 216 |
| 420 | 357 | 212 |
| 520 | 443 | 211 |
| 620 | 527 | 210 |
| 720 | 613 | 208 |

[1] Does not include the 80 ml. of treating solution injected in Example III.

Inspection of the data in Table III above shows that the improved result obtained by injection of guanidine hydrochloride in methanol into the plug was still retained even after additional 613 pore volumes of water had been injected through the treated core. The water permeability of the plug after such treatment was found to be about 208% of the original permeability. This example demonstrates that the treating solution of the present invention is effective to maintain the water permeability of the core wherein such treatment is followed by conventional water flooding and/or steam injection treatment as in known secondary recovery operations. In particular it should be noted that after treatment with more than 600 pore volumes of water, the guanidine hydrochloride in methanol treated plug still retained more than 200% of the original permeability.

*Example V*

In another test a plug from core B above was injected with a 5 gram/100 ml. solution of guanidine hydrochloride in distilled water. After 5 ml. of the 5 gram/100 ml. guanidine hydrochloride in distilled water had been injected into the plug the permeability was reduced to about 82% of the plugs original permeability; after a total of 25 ml. to 79.5%; after a total of 50 ml. to 78%; after a total of 100 ml. to 74.5%; after a total of 150 ml. to 71%; and after a total of 170 ml. to 70% of the original permeability of the plug to formation water.

The plug then was injected with 30 ml. of distilled water and the permeability was found to be only 59% of the original permeability. An additional 50 ml. of water injected into the plug decreased the original permeability to 21.5% which was reduced to 3.5% of the original permeability on treatment with an additional 100 ml. of water and with a further addition of 37 ml. of water the permeability was lowered to 2.5% of the original permeability.

This example demonstrates that guanidine hydrochloride in water solution is not effective in improving the permeability of clayey underground formations. It confirms the teaching of U.S. Patent 2,761,843 to the effect that guanidine hydrochloride in an aqueous solution is not satisfactory for stabilizing water sensitive clays.

*Example VI*

The plug of Example V above after having been treated with a total of 382 ml. of treating solution (170 ml. of guanidine hydrochloride in distilled water followed by 212 ml. of distilled water) in accordance with the procedure of Example V above was further treated with a 5-gram/100 ml. solution of guanidine hydrochloride in methanol. After 13 ml. of guanidine hydrochloride in methanol were injected into the plug, the permeability was found to have increased from 2.5% to 12%; after an additional treatment of 25 ml. to 73%; and after an additional 25 ml. to 88% of the original permeability of the plug. An additional injection of 32 ml. of guanidine hydrochloride in methanol into the plug increased the permeability to 96% of the original permeability. This represents a gain of 94 percentage points from the lowest permeability of 2.5% (obtained by combination of guanidine hydrochloride in water treatment followed by distilled water treatment).

Following the treatment the plug was again injected with distilled water. Injection of 18 ml. of distilled water decreased the permeability to 43%. After injection of an additional 100 ml. of water the permeability had increased to 56% of the original permeability and with an additional 120 ml. to about 59% of the original permeability. The plug was saturated with distilled water and left overnight. The next morning the permeability was found to have increased to 123% of the original permeability. Injection of distilled water was continued and it was found that after a further 30 ml. injection the permeability had increased to 155%, and after an additional 50 ml. to 180%, and after an additional 100 ml. to 183% of the original permeability.

This example demonstrates the effectiveness of guanidine hydrochloride in methanol in restoring the permeability of water damaged cores as is evidenced by the gain of 181 percentage points through the use of guanidine hydrochloride in methanol from the low point of 2.5% of the original permeability resulting from the treatment with guanidine hydrochloride in distilled water followed by injection of distilled water.

The following table presents in tabular form the results obtained in Examples V and VI above.

TABLE IV

| Amount Injected | | Cumulative Pore Volumes | Percent Original Permeability |
|---|---|---|---|
| Cumulative, ml. | Individual, ml. | | |
| EXAMPLE V | | | |
| 5% Guanidine HCl in Water | | | |
| 0 | 0 | 0 | 100 |
| 5 | 5 | 3.55 | 82 |
| 25 | 20 | 17.8 | 79.5 |
| 50 | 25 | 35.6 | 78 |
| 100 | 50 | 71 | 74.5 |
| 150 | 50 | 107 | 71 |
| 170 | 20 | 121 | 70 |
| Distilled Water | | | |
| 200 | 30 | 142 | 59 |
| 250 | 50 | 178 | 21.5 |
| 350 | 100 | 249 | 3.5 |
| 387 | 37 | 275 | 2.5 |
| EXAMPLE VI | | | |
| 5% Guanidine HCl in Methanol | | | |
| 400 | (13) | 284 | 12 |
| 425 | (25) | 302 | 73 |
| 450 | (25) | 321 | 88 |
| 482 | (32) | 342 | 96 |
| Distilled Water | | | |
| 500 | 18 | 355 | 43 |
| 600 | 100 | 426 | 56 |
| 720 | 120 | 512 | 59* |
| *After Standing Overnight Changed to— | | | 123* |
| 750 | 30 | 534 | 155 |
| 800 | 50 | 568 | 180 |
| 900 | 100 | 639 | 183 |

*Example VII*

A field trial was conducted to demonstrate the effectiveness of the treating method of the present invention.

A well in the Kyote Field, Atascosa County, Texas, was selected for the test. There was injected into the well a low salinity supply water containing approximately 1200 p.p.m. of dissolved solids at an initial rate of 240 barrels per day and a pressure of about 1400 p.s.i.g. to determine the injectivity thereof. Injection of the supply water was continued for an 11 day period. After 6 days the injectivity rate had decreased to 5 barrels a day and after 11 days to less than 3 barrels a day. The total amount of injection water was 530 bbls. The well was treated with 5 weight percent guanidine hydrochloride in methanol over a 9 day period. The initial rate of injection of treating solution was at the rate of 3 barrels per day which increased to 57 barrels per day during treatment. A total of 150 bbls. of treating solution was injected into the well during the 9 day treating period.

Thereafter, injection of the supply water was resumed at an initial rate of 57 barrels per day. After one day the injection rate was increased to 87 barrels per day; to 135 barrels after a total of 2 days; to 180 barrels after a total of 3 days; and to 183 barrels after 4 days. The injection rate of 183 barrels a day was maintained for 12 additional days. In all, 1813 bbls of supply water were injected into the well following the treating solution.

Obviously, many modifications and variations of the invention as hereinbefore set forth may be made without departing from the spirit and scope thereof and therefore only such limitations should be imposed as are indicated in the appended claims.

We claim:

1. A method of stabilizing a clay containing body which comprises contacting said body with a guanidine salt in a polar oxygenated aliphatic hydrocarbon solvent selected from the group consisting of a lower alkanol, dimethylsulfoxide, an admixture of dioxane and dimethylsulfoxide, and a mixture of said lower alkanols in an amount sufficient to stabilize said clay-containing body.

2. A method as claimed in claim 1 wherein said guanidine salt is guanidine hydrochloride.

3. A method as claimed in claim 1 wherein said guanidine salt is guanidine acetate.

4. A method as claimed in claim 1 wherein the polar oxygenated aliphatic hydrocarbon is a lower alkanol.

5. A method as claimed in claim 4 wherein the lower alkanol is methanol.

6. A method as claimed in claim 4 wherein the lower alkanol is ethanol.

7. A method as claimed in claim 4 wherein the lower alkanol is propanol.

8. A method as claimed in claim 1 wherein the polar oxygenated aliphatic hydrocarbon solvent is dimethylsulfoxide.

9. A method as claimed in claim 1 wherein the polar oxygenated aliphatic hydrocarbon solvent is an admixture of methanol and ethanol.

10. A method as claimed in claim 1 wherein the polar oxygenated aliphatic hydrocarbon solvent is a mixture of 55 to 60 volume percent dioxane and 45 to 40 volume percent dimethylsulfoxide.

11. A method as claimed in claim 1 wherein said clay-containing body is adjacent a well bore, said guanidine salt is guanidine hydrochloride and said solvent is methanol.

12. A method of recovering oil from an oil bearing underground formation containing clay wherein a displacement fluid selected from the group consisting of water, steam and mixtures thereof is applied to said formation and oil is recovered therefrom which comprises introducing a treating solution consisting of a guanidine salt in a polar oxygenated aliphatic hydrocarbon solvent selected from the group consisting of a lower alkanol, dimethylsulfoxide, an admixture of dioxane and dimethylsulfoxide, and a mixture of said lower alkanols into said formation, contacting said clay with said treating solution, thereafter introducing said displacement fluid into said formation under pressure to force said treating solution through the formation and recovering oil from said formation.

13. A method as claimed in claim 12 wherein said guanidine salt is guanidine hydrochloride.

14. A method as claimed in claim 12 wherein said guanidine salt is guanidine acetate.

15. A method as claimed in claim 12 wherein the polar oxygenated aliphatic hydrocarbon solvent is a lower alkanol.

16. A method as claimed in claim 15 wherein the lower alkanol is methanol.

References Cited

UNITED STATES PATENTS

| | | | |
|---|---|---|---|
| 2,414,668 | 1/1947 | Ratcliffe | 166—44 X |
| 2,761,843 | 9/1956 | Brown et al. | |
| 2,839,466 | 6/1958 | Shock et al. | 166—42 X |
| 3,036,630 | 5/1962 | Bernard et al. | 166—42 X |
| 3,131,759 | 5/1964 | Slusser et al. | |
| 3,236,306 | 2/1966 | Atwood | 166—42 |

CHARLES E. O'CONNELL, *Primary Examiner.*

IAN A. CALVERT, *Assistant Examiner.*